Patented July 28, 1931

1,816,087

UNITED STATES PATENT OFFICE

FELIX LINDNER AND FRIEDRICH LINK, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PRODUCTION OF CARBAMIDES INCLUDING UREA

No Drawing. Application filed July 25, 1929, Serial No. 381,064, and in Germany August 22, 1928.

The present invention relates to the production of urea and substitution products thereof.

We have found that carbamides can be very advantageously produced by passing ammonia or primary amines and carbon oxides over catalytic substances consisting of or comprising carbides. For example, the carbides of iron, nickel, cobalt, titanium, silicon or of the alkaline earth metals are very suitable as catalysts. The temperature to be employed in the process is preferably chosen between about 250° and 500° centigrade.

Instead of carbon dioxide or carbon monoxide, gases containing carbon dioxide or carbon monoxide or both, for example water gas, and instead of ammonia or primary amines gases containing ammonia or primary amines or both can be employed; in each case it is preferable to employ an excess of the oxide or oxides of carbon over the quantity thereof theoretically required for a complete conversion of the ammonia or primary amines employed. By employing amines or mixtures containing amines, simple or multiple substituted derivatives of urea are obtained depending on the molecular proportions of the components employed.

The following examples will further illustrate the nature of this invention, but the invention is not restricted to these examples. The parts are by volume, if not otherwise stated.

Example 1

A mixture of 10 parts of carbon dioxide and 4 parts of ammonia is passed over silicon carbide at about 500° centigrade. From the resulting gases pure urea melting at 132° to 134° centigrade separates out in a strongly cooled receiver.

Example 2

A mixture of 6 parts of carbon monoxide and 10 parts of ammonia is passed over iron carbide at from 450° to 500° centigrade. In a condenser fed with warm water urea in the form of pure crystals melting at 132° centigrade separates out from the gas leaving the reaction chamber.

Example 3

By passing aniline vapour and carbon dioxide in a proportion of 2 to 1 with reference to their molecular weights over calcium carbide at about 500° centigrade, diphenylurea is obtained.

What we claim is:—

1. The process of producing carbamides which comprises passing a compound containing the $NH_2$ group in the vapour phase with an oxide of carbon over a catalyst comprising a carbide.

2. The process of producing carbamides which comprises passing a compound containing the $NH_2$ group in the vapour phase with an oxide of carbon at above 250° C. over a catalyst comprising a carbide.

3. The process of producing urea which comprises passing ammonia with an oxide of carbon over a catalyst comprising a carbide.

4. The process of producing urea which comprises passing ammonia with an oxide of carbon at above 250° C. over a catalyst comprising a carbide.

5. The process of producing urea which comprises passing ammonia with carbon monoxide at above 250° C. over a catalyst comprising a carbide.

In testimony whereof we have hereunto set our hands.

FELIX LINDNER.
FRIEDRICH LINK.